(12) United States Patent
Jamar et al.

(10) Patent No.: US 9,469,070 B2
(45) Date of Patent: Oct. 18, 2016

(54) LAYERWISE PRODUCTION METHOD AND ILLUMINATION SYSTEM FOR USE THEREIN

(75) Inventors: Jacobus Hubertus Jamar, Vessem (NL); Herman Hendrikus Maalderink, Nuenen (NL); Wilhelmus Petrus van Vliet, Neunen (NL)

(73) Assignee: NEDERLANDSE ORGANISATIE VOOR TOEGEPAST-NATUURWETENSCHAPPELIJK ONDERZOEK TNO, Delft (NL)

( * ) Notice: Subject to any disclaimer, the term of this patent is extended or adjusted under 35 U.S.C. 154(b) by 1076 days.

(21) Appl. No.: 12/823,916

(22) Filed: Jun. 25, 2010

(65) Prior Publication Data

US 2010/0320648 A1 Dec. 23, 2010
US 2013/0334740 A9 Dec. 19, 2013

Related U.S. Application Data

(63) Continuation of application No. PCT/NL2008/050853, filed on Dec. 24, 2008.

(30) Foreign Application Priority Data

Dec. 27, 2007 (EP) ..................................... 07150447

(51) Int. Cl.
*B29C 67/00* (2006.01)

(52) U.S. Cl.
CPC ......... *B29C 67/0055* (2013.01); *B29C 67/007* (2013.01)

(58) Field of Classification Search
CPC .................................................. B29C 67/0055
USPC .......................................................... 264/401
See application file for complete search history.

(56) References Cited

U.S. PATENT DOCUMENTS

2003/0082487 A1 5/2003 Burgess
2005/0175302 A1* 8/2005 Ishikawa et al. ............. 385/115

FOREIGN PATENT DOCUMENTS

JP 05138746 6/1993

* cited by examiner

*Primary Examiner* — Larry Thrower
(74) *Attorney, Agent, or Firm* — Mark T. Vogelbacker; Reed Smith LLP

(57) ABSTRACT

An illumination system for use in a system (1) for layerwise production of a tangible object (5) in a liquid reservoir (2) comprises an image forming element (21), an image projection system (22, 23) and a microlens array (7). The illumination system (20) further comprises a controller (24) for controlling the microlens array (7) to perform a movement (9) which is relative to at least part of the image projection system (22, 23) and for controlling the image forming element (21) to form time-varying two-dimensional images synchronously with said movement in such way that microspots (17) describe and solidify a predetermined area of a liquid layer (10) when said movement (9) is also relative to the object (5) under construction.

4 Claims, 4 Drawing Sheets

LAYERWISE PRODUCTION METHOD AND ILLUMINATION SYSTEM FOR USE THEREIN

This application is a continuation of copending application PCT/NL2008/050853, filed Dec. 24, 2008, which claims the priority of application EP 07150447.6, filed Dec. 27, 2007.

RELATED APPLICATIONS

This application is the United States National Stage of International Application No. PCT/NL2008/050853, filed Dec. 24, 2008, which was published as International Publication No. WO 2009/084957, and which claims benefit of European Patent Application No. 07150447.6 filed Dec. 27, 2007. Both applications are incorporated by reference in their entirety herewith.

FIELD AND BACKGROUND OF THE INVENTION

The invention relates to a method for layerwise production of a tangible object. The invention also relates to an illumination system for use in a system for layerwise production of a tangible object.

A known system for performing such a method is for example an apparatus sold by Envision Technologies GmbH, Germany under the name "Perfactory". This known apparatus is used in the field of Layered Manufacturing Technology (LMT), often referred to as Rapid Prototyping (RP) or Rapid Manufacturing (RM), to produce a tangible object. Rapid Prototyping (RP) and Rapid Manufacturing (RM), are called "rapid" since they do not require a mould to be designed and manufactured.

The illumination system of the Perfactory comprises a Digital Micromirror Device (DMD). For the Perfactory, a working area of an object to be produced typically has dimensions like 3 cm×4 cm, for which the DMD typically employs 1280×1024 pixels. Those objects are relatively small. When it is desired to produce larger objects, larger working areas are required, for example in the order of magnitude 30 cm×40 cm. When, in addition, it is desired to produce such larger objects with the same accuracy as the smaller objects, correspondingly higher pixel amounts would be required. However, employing such high pixel amounts of the DMD is currently not within reach. Thus, with the Perfactory, it is not possible to accurately produce small product details for larger objects.

SUMMARY OF THE INVENTION

It is an object of the invention to provide a solution according to which, for the production of larger sized products, larger working areas of layers can be solidified with high resolution and without needing to increase the resolution of an image forming element of an illumination system used in the production.

Therefore, according to a first aspect of the invention, a method according to the independent claim is provided.

In this method according to the first aspect of the invention, the solidifying is carried out by illuminating the predetermined area by means of an illumination system that comprises an image forming element controllable to form time-varying two-dimensional images, an image projection system and a microlens array comprising individual microlenses which are arranged in two dimensions of a straight plane, the image projection system being arranged for projecting the two-dimensional images onto the microlens array such that individual ones of the microlenses each project radiation incident thereon in the form of separate corresponding concentrated microspots onto the predetermined area of the liquid layer, wherein, for at least one of said method cycles, the microlens array is controlled to perform a movement which is parallel to said straight plane, relative to at least part of the image projection system and relative to the object under construction, while synchronously the image forming element is controlled to form the time-varying two-dimensional images, in such way that during said movement of the microlens array the microspots describe and solidify the predetermined area of the liquid layer.

In this way, the microspots "write" over the liquid layer in order to solidify the predetermined area of it. In order to obtain high resolution, the separate concentrated microspots may be arranged at relatively large distances apart from each other, since the intermediate spaces between the microspots can be reached in the course of time during the "writing".

It is remarked that the abovementioned object of the invention is also reached with a method according to the independent claim, when such method is adapted in that, instead of moving the microlens array relative to at least part of the image projection system and relative to the object under construction, the image forming element and/or the image projection system are controllably moved together with the microlens array relative to the object under construction. Hence, in such adapted method, for example the total illumination system is controllably moved relative to the object under construction, for example by moving the total illumination system relative to the environment while keeping the object under construction fixed relative to the environment, or by moving the object under construction relative to the environment while keeping the total illumination system fixed relative to the environment. However, a method according to the independent claim has the advantage over such adapted method that it requires only little mass (i.e. substantially only the mass of the microlens array) to be moved with high accuracy. This is less complicated to realize and less energy consuming than moving the larger mass of for example a total illumination system, or than moving an object under construction.

Furthermore, according to a second aspect of the invention, an illumination system is disclosed herein.

It is remarked that a method according to the invention and an illumination system according to the invention can be applied by making use of a (transparent) construction shape, wherein the solidifying of the predetermined area of the liquid layer is carried out when said liquid layer is adjoining the construction shape and wherein, during a method cycle, the obtained solid layer is separated from said construction shape. The construction shape can for example be a transparent bottom part of the liquid reservoir, wherein, during a method cycle, radiation of the illumination system is incident onto the liquid layer from below so that a lowermost layer of the object under production is solidified. Alternatively, the construction shape can for example be situated such that an uppermost layer, instead of a lowermost layer, of an object under production is solidified during a method cycle. In that case, for example a vertically movable product holder can for example be situated under the object under production, while for example the illumination system can be situated such that radiation of the illumination system is incident onto the liquid layer from above, in stead of from below. In fact, when use is made of a construction shape, a method according to the invention and an illumination system according to the invention are applicable to layerwise production operating in any orientation with respect to gravity. However, a method according to the invention and an illuminations system according to the invention can also be applied in cases when no use is made of a construction shape, for example when the solidifying of the predetermined area of the liquid layer is carried out when said liquid layer forms an uppermost layer of the liquid in the liquid reservoir.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the schematic figures in the enclosed drawing.

DETAILED DESCRIPTION

Figure 1:
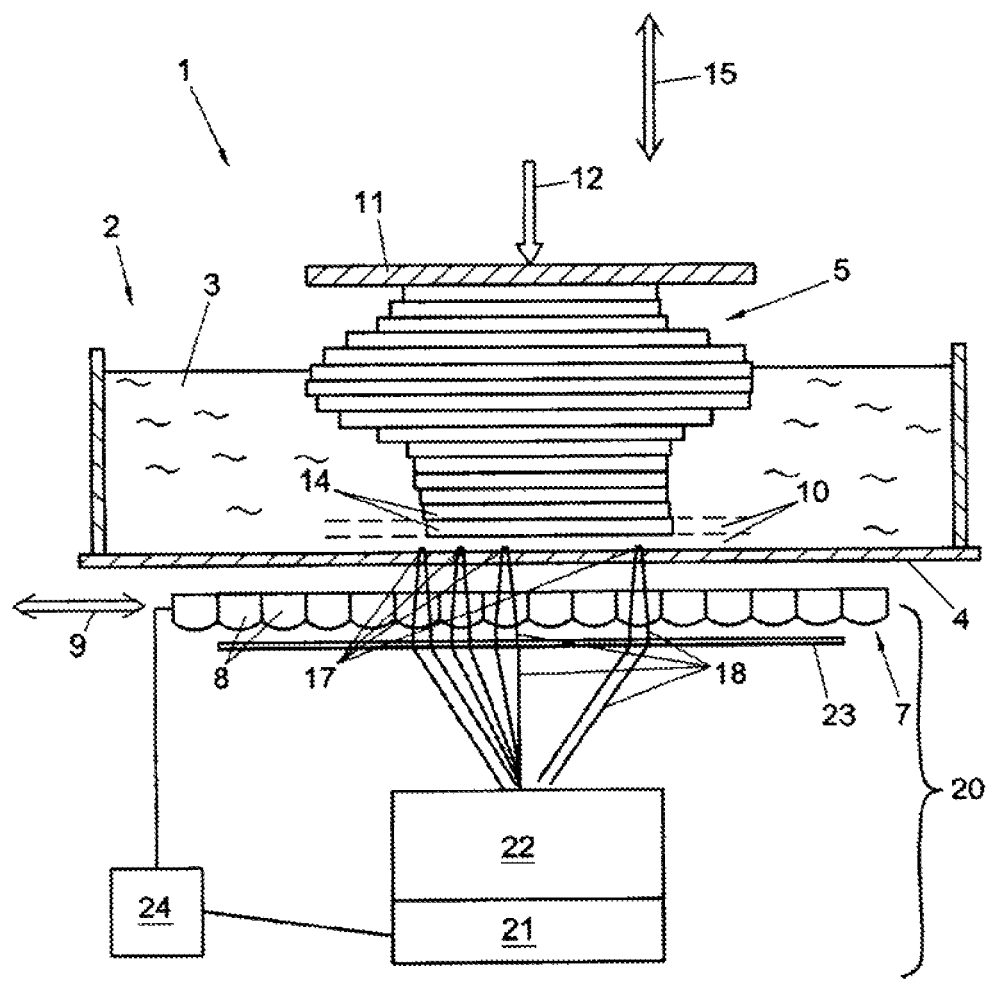
FIG. 1 schematically shows, in sectional side view, an example of an embodiment of an illumination system according to the invention used in a system for use in an example of an embodiment of a method according to the invention.

Reference is first made to FIG. 1 which shows an example of a system 1 for layerwise production of a tangible object 5. The system 1 can perform an example of a method for layerwise production of a tangible object according to the invention. The tangible object 5 is shown while being produced. It may for example be a prototype or model of an article of manufacture or other suitable type of object.

The system 1 comprises a liquid reservoir 2 which is filled with a liquid 3. The system 1 further comprises an illumination system 20. The illumination system 20 is arranged for illuminating a predetermined area of a liquid layer 10 of the liquid 3 so as to solidify the predetermined area in order to obtain a solid layer 14 of the tangible object 5, the solid layer thus having a predetermined shape.

For that purpose, in the shown example, the liquid reservoir 2 has a bottom plate 4, which is transparent to radiation 18 emitted by the illumination system 20. The bottom plate 4 also functions as a construction shape, wherein the solidifying of the predetermined area of the liquid layer is carried out when said liquid layer is adjoining the construction shape. In this example, radiation of the illumination system is incident onto the liquid layer from below so that a lowermost layer of the object 5 under production is solidified.

During a method cycle of a method according to the invention, the obtained solid layer is separated from the bottom plate 4. In the shown example, this separation is realized by means of a carrier plate 11 which holds the product 5 under construction. As indicated by double-arrow 15 in FIG. 1, the carrier plate 11 is movable up and down relative to the reservoir 2 by the action of a carrier plate actuator 12. A firstly formed solid layer of the tangible object 5 is adhered to the underside of the carrier plate 11. Consecutively formed solid layers are each adhered to a previously formed solid layer, respectively. Each time after solidification of a new layer, the carrier plate together with the solidified layers adhered thereon are moved upwards, as a result of which the last formed solid layed each time is being separated from the bottom plate 4. During separation, the liquid 3 will flow in between the separated solid layer 14 and the bottom plate 4 so as to form a fresh liquid layer 10 therebetween.

The illumination system 20 comprises an image forming element 21, an image projection system 22, 23, and a microlens array 7. The image forming element 21 is controllable to form time-varying two-dimensional images. The microlens array 7 comprises individual microlenses 8 which are arranged in two dimensions of a straight plane. The image projection system 22, 23 is arranged for projecting the two-dimensional images onto the microlens array 7 such that individual ones of the microlenses 8 each project radiation 18 incident thereon in the form of separate corresponding concentrated microspots 17 onto the predetermined area of the liquid layer 10. The image forming element, the image projection system and the microlens array may each as such be of various types, such as the various types known in the art of illuminations systems.

As a special technical feature of the invention, the microlens array 7 is controllabe to perform a movement which is parallel to said straight plane, as well as relative to at least part of the image projection system 22, 23. Such a movement of the microlens array 7 is indicated by double-arrow 9 in FIG. 1.

As a further special technical feature of the invention, the illumination system 20 further comprises a controller 24 for controlling the microlens array 7 to perform said movement 9 and for controlling the image forming element 21 to form the time-varying two-dimensional images synchronously with said movement 9 in such way that the microspots 17 describe and solidify the predetermined area of the liquid layer 10 when said movement 9 is also relative to the tangible object 5 under construction.

As follows from the above, the described system 1 that comprises the described illumination system 20 can be used in a method according to the independent claim.

Figure 2A:
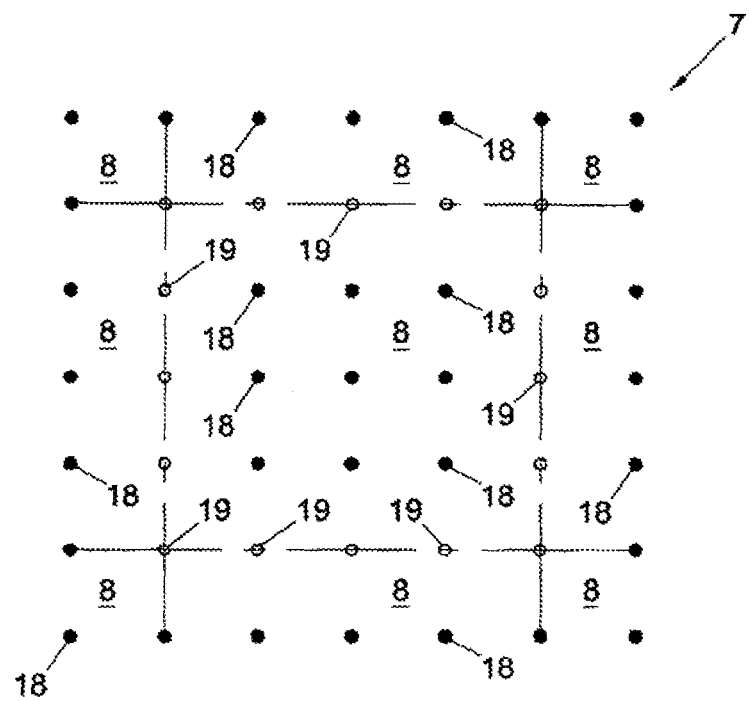
FIG. 2A schematically shows, in plan view, a portion of the microlens array of the illumination system of FIG. 1.
Figure 2B:
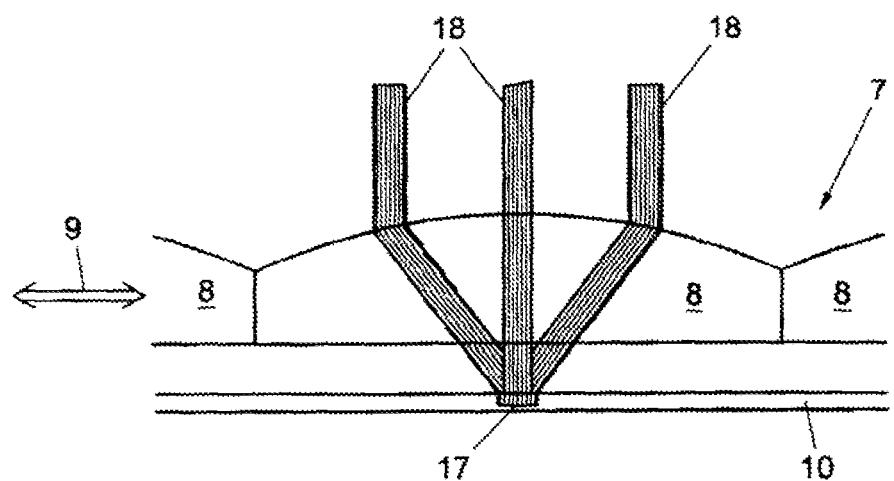
FIG. 2B schematically shows the portion of the microlens array of FIG. 2A in sectional side view.

Reference is now made to FIGS. 2A and 2B. FIG. 2A shows, in plan view, a portion of the microlens array 7 of FIG. 1 at an instantaneous point in time during illumination. The shown portion comprises a microlens 8 shown in the center of FIG. 2A, as well as portions of eight microlenses 8 surrounding the center microlens 8. In the example of FIG. 2A, the reference numbers 18 and 19 correspond with "pixels" of the time-varying two-dimensional images formed by the image forming element 21, for example by means of a Digital Micromirror Device (DMD). The black-filled circles 18 in FIG. 2A correspond to pixels for which at the instantaneous point in time radiation is generated, while the open circles 19 in FIG. 2A correspond to pixels for which at the instantaneous point in time no radiation is generated. In FIG. 2B it is shown that the center microlens 8 projects the radiation 18 incident thereon in the form of a corresponding concentrated microspot 17 onto the predetermined area of the liquid layer 10. In plan view, the concentrated microspot 17 will be substantially centered relative to its corresponding microlens 8.

As stated, during a method cycle, the microlens array can be controlled to perform the said movement 9, while synchronously the image forming element 21 is controlled to form the time-varying two-dimensional images, in such way that during said movement 9 the microspots 17 describe and solidify the predetermined area of the liquid layer 10. During such movement 9, the part of the trajectory of the emitted radiation before the radiation reaches the microlens array remains, in the shown example, fixed relative to the liquid layer 10. This means that, during such movement 9, the black-filled circles 18 and the open circles 19 in FIG. 2A move relative to the microlens array 7. However, it also means that the microspots 17 will indeed move relative to the liquid layer 10 since the microspots 17 will remain substantially centered relative to their corresponding microlenses 8.

In order to avoid cross-talk between neighbouring microlenses 8, said controlling may include to time-dependently stop projecting radiation for those pixels for which the corresponding radiation would be incident at or close to the transitions between neighbouring microlenses 8. The open circles 19 in FIG. 2A are an illustration of this.

Figure 3:
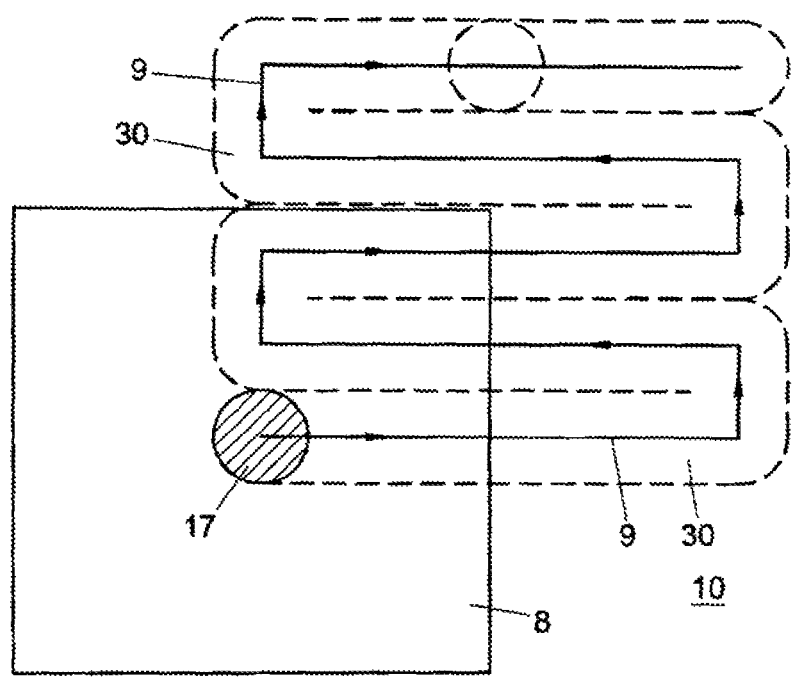
FIG. 3 schematically shows, in plan view, a microlens of the microlens array of the illumination system of FIG. 1, wherein a movement path of the microlens array is indicated.

An example of one of the many possibilities for such movement 9 is given in FIG. 3. Therein, the microlens 8, as well as its corresponding microspot 17 are moving along a more or less "slalom" like movement path 30 relative to the liquid layer 10. In this way, the microspot 17 may describe a more or less continuous square like two-dimensional area portion of the liquid layer 10. Together with the other microspots 17 of the other microlenses 8 of the microlens array 7, the microspots 17 can describe and solidify the predetermined area of the liquid layer 10.

Preferably, but not necessarily, the method is carried out such that, for at least one of the method cycles, the image projection system projects the two-dimensional images onto the microlens array such that radiation corresponding to the two-dimensional images is incident on the microlens array 7 in a direction which is substantially orthogonal to said straight plane. In the shown example, this is realized in that the image projection system comprises an additional lens 23 to that effect. The additional lens 23 may be arranged such that it either does or does not move together with the microlens array 7. An advantage of such substantially orthogonally incident radiation is, that it ensures that the microspots 17 will be accurately centered relative to their corresponding microlenses 8, thus improving the accuracy of production of objects 5.

Figure 4A:
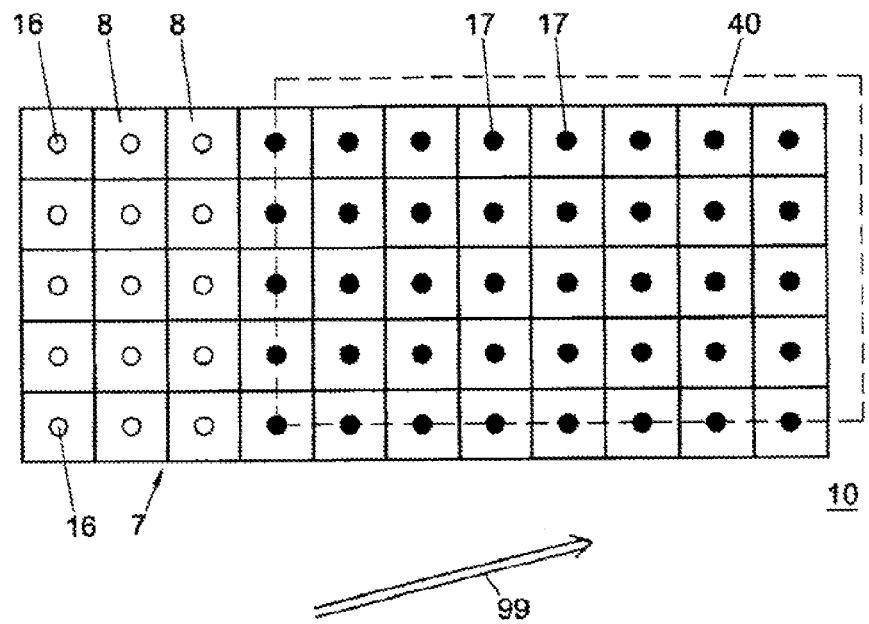
FIG. 4A schematically shows, in plan view, an example of a microlens array of the illumination system of FIG. 1, at the start of another type of movement path of the microlens array.
Figure 4B:
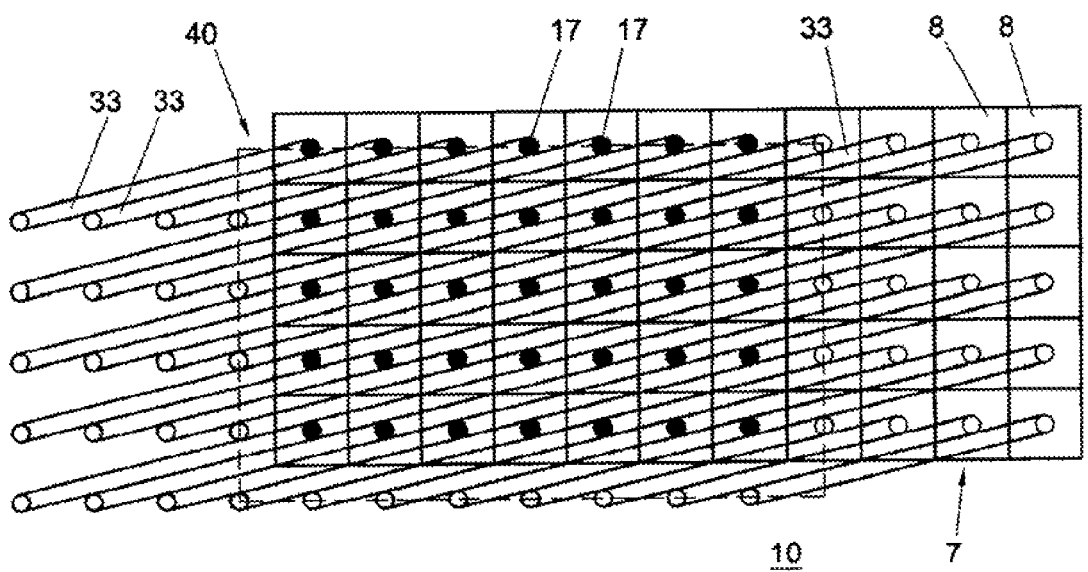
FIG. 4B schematically shows the microlens array of FIG. 4A again, however, at the end of the other type of movement path of the microlens array.

Preferably, the method is carried out with a microlens array whose microlenses are arranged in equidistant rows and equidistant columns, which rows and columns are mutually perpendicular, while the method is then carried out such that, for at least one of said method cycles, said movement of the microlens array is a rectilinear movement which is inclined relative to the directions of the rows and columns. Such a situation is illustrated in FIGS. 4A and 4B. FIG. 4A shows the microlens array 7 whose microlenses 8 are arranged in equidistant rows and equidistant columns, which rows and columns are mutually perpendicular. Reference numeral 40 indicates a working area of the liquid layer 10. The predetermined area of the liquid layer 10 that has to be solidified is comprised in this working area 40. The rectilinear movement which is inclined relative to the directions of the rows and columns is indicated by the arrow 99 in FIG. 4A. FIG. 4A shows the situation at the start of the movement during a method cycle, while FIG. 4B shows the situation at the end of the movement. In this case, the image projection system 22, 23 may be so arranged that the two-dimensional images will only be projected within the working area 40. Hence, in FIGS. 4A and 4B microspots 17 (indicated by black-filled circles) will only occur within the working area 40. Outside the working area 40 no microspots will occur. The shown open circles 16 each merely refer to a position where a microspot would have occurred if the image projection system 22, 23 would have projected radiation upon the corresponding microlens 8. Note that in FIGS. 4A and 4B all circles lying within the working area 40 are black-filled circles 17. This is only done for illustrative purposes. In fact, whether or not a particular position in the working area must be a microspot, is depending upon the predetermined geometry of the object 5 to be produced.

In FIG. 4B the reference numerals 33 indicate movement paths of the circles 16 and 17 due to the movement 99 of the microlens array 7 relative to the liquid layer 10. The movement paths of the microspots 17 form part of these movement paths 33 and are comprised in the working area 40. It will be clear that, thanks to the inclined direction of the movement 99, the microspots 17 will be able to reach the full working area 40 by performing the movement 99 only once. Various inclination angles can be selected. By selecting the surface areas of the microspots and the degree of inclination of the movement 99 and by matching these surface areas to this degree of inclination, the accuracy of production of objects 5 can be adjusted. Also the required size of the working area can be adjusted in this way. Therefore, the method is powerful in the sense that high accuracy as well as various object sizes can be realized with one and the same microlens array. In addition, the method is practical and reliable since the inclined movement is a simple movement to realize.

More preferably, the method is carried out such that the inclination of said movement 99 is predetermined such that when the microlens array 7 has travelled in its row direction a distance corresponding to a predetermined integer number of consecutive columns, the microlens array 7 has also travelled in its column direction a distance corresponding to a predetermined integer number of consecutive rows. This is in fact the case in the example of FIGS. 4A and 4B and can be seen in that individual movement paths 33 of circles 16 or 17 are in line with each other to form a rectilinear chain of such movement paths 33. In this way it is very efficiently realized that the full working area is covered by such movement paths. That is, only a simple and short movement 99 has to be carried out.

As an illustration of only one of the very many possibilities, the following practical example is given. In this example, the working area has dimensions 480×360 millimeter. The image forming element is based upon a DMD having 1024×768 pixels to cover this working area. The microlens array has equidistant lenses in 280×181 columns and rows. Each lens has dimensions of 2×2 millimeter. Hence, the lens area of the microlens array has dimensions of 560×362 mm. About 240×180 columns and rows of the microlens array will cover the working area. Each microlens corresponds to about 4×4 pixels of the DMD. The diameter of the microspots is about 50 micrometer. The inclination of said rectilinear relative movement 99 is predetermined such that when the microlens array has travelled in its row direction an 80 millimeter distance corresponding to 40 consecutive columns, the microlens array has also travelled in its column direction a 2 millimeter distance corresponding to 1 row.

It is remarked that advantegeous effects of performing the inclined rectilinear movement of the types as described above with reference to FIGS. 4A and 4B, are also obtained when the method is adapted in that, instead of moving the microlens array relative to at least part of the image projection system and relative to the object under construction, the image forming element and/or the image projection system are controllably moved together with the microlens array relative to the object under construction. Hence, in such adapted method, for example the total illumination system is controllably moved relative to the object under construction, for example by moving the total illumination system relative to the environment while keeping the object under construction fixed relative to the environment, or by moving the object under construction relative to the environment while keeping the total illumination system fixed relative to the environment.

Furthermore, it is remarked that the described illumination system can also be used in other methods for production of tangible objects, which other methods are adapted relative to the methods described above. One such adaptation is that, instead of repeatedly performing the described method cycles, only a single such method cycle is performed for the production of only a single layer of the object. Another such adaptation is that, instead of providing a liquid reservoir containing a liquid and instead of creating a liquid layer, a foil is applied to an object under construction, which foil is then partly illuminated. Such illumination may directly result in illuminated parts of the foil being solidified. Alternatively, such illumination may result in illuminated parts of the foil being insoluble in a developer (e.g. water), so that the required layer of the object may be obtained by applying such developer to the illuminated foil.

The invention claimed is:

1. A method for layerwise production of a tangible object, the method comprising:
   providing a liquid reservoir containing a liquid; and
   repeatedly performing method cycles, each method cycle comprising the steps of:
      solidifying a predetermined area of a liquid layer of the liquid, so as to obtain a solid layer of the tangible object, the solid layer thus having a predetermined shape, and
      creating, parallel and adjacent to the solid layer, a successive liquid layer of the liquid for carrying out a successive such method cycle for similar solidifying a predetermined area of the successive liquid layer, so as to obtain a successive such solid layer adhered to the solid layer;
   wherein the solidifying is carried out by illuminating the predetermined area by means of an illumination system that comprises an image forming element controllable to form time-varying two-dimensional images, an image projection system and a microlens array comprising individual microlenses which are arranged in two dimensions of a straight plane, the image projection system being arranged for projecting the two-dimensional images onto the microlens array such that individual ones of the microlenses each project radiation incident thereon in the form of separate corresponding concentrated microspots onto the predetermined area of the liquid layer; and
   wherein, for at least one of said method cycles, the microlens array is controlled to perform a movement which is parallel to said straight plane, relative to at least said radiation incident thereon and relative to the object under construction, while synchronously the image forming element is controlled to form the time-varying two-dimensional images, in such way that during said movement of the microlens array the microspots describe and solidify the predetermined area of the liquid layer.

2. A method according to claim 1, wherein, for at least one of said method cycles, the image projection system projects the two-dimensional images onto the microlens array such that radiation corresponding to the two-dimensional images is incident on the microlens array in a direction which is orthogonal to said straight plane.

3. A method according to claim 1, wherein the microlenses of the microlens array are arranged in equidistant rows and equidistant columns, which rows and columns are mutually perpendicular, and wherein, for at least one of said method cycles, said movement of the microlens array is a rectilinear movement which is inclined relative to the directions of the rows and columns.

4. A method according to claim 3, wherein the inclination of said movement is predetermined such that when the microlens array has travelled in its row direction a distance corresponding to a predetermined integer number of consecutive columns, the microlens array has also travelled in its column direction a distance corresponding to a predetermined integer number of consecutive rows.

* * * * *